United States Patent
Miyazaki et al.

(10) Patent No.: US 12,536,799 B2
(45) Date of Patent: Jan. 27, 2026

(54) MOVING IMAGE INTEGRATION DEVICE, MOVING IMAGE INTEGRATION METHOD, AND MOVING IMAGE INTEGRATION PROGRAM

(71) Applicant: OMRON CORPORATION, Kyoto (JP)

(72) Inventors: Masashi Miyazaki, Kyoto (JP); Hirotaka Wada, Kyoto (JP); Hiroomi Onda, Kyoto (JP); Kenta Nishiyuki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/842,909

(22) PCT Filed: Feb. 1, 2023

(86) PCT No.: PCT/JP2023/003245
§ 371 (c)(1),
(2) Date: Aug. 30, 2024

(87) PCT Pub. No.: WO2023/171184
PCT Pub. Date: Sep. 14, 2023

(65) Prior Publication Data
US 2025/0182482 A1 Jun. 5, 2025

(30) Foreign Application Priority Data
Mar. 11, 2022 (JP) ................. 2022-038606

(51) Int. Cl.
G06V 20/52 (2022.01)
G06V 20/40 (2022.01)
G06V 40/10 (2022.01)

(52) U.S. Cl.
CPC .............. *G06V 20/46* (2022.01); *G06V 20/52* (2022.01); *G06V 40/10* (2022.01)

(58) Field of Classification Search
CPC ......... G06V 20/46; G06V 20/52; G06V 40/10
See application file for complete search history.

(56) References Cited

U.S. PATENT DOCUMENTS

| 2012/0081551 A1* | 4/2012 | Mizuno | H04N 7/181 348/150 |
|---|---|---|---|
| 2016/0253618 A1 | 9/2016 | Imazawa et al. | |

(Continued)

FOREIGN PATENT DOCUMENTS

| CN | 112434666 B | 3/2022 |
|---|---|---|
| JP | 2019-152802 A | 9/2019 |

(Continued)

OTHER PUBLICATIONS

Ren et al., "Faster R-CNN: Towards Real-Time Object Detection with Region Proposal Networks" (2016).

(Continued)

*Primary Examiner* — Thai Q Tran
*Assistant Examiner* — Jose M Mesa
(74) *Attorney, Agent, or Firm* — Morgan, Lewis & Bockius LLP

(57) ABSTRACT

The present disclosure provides a video image integrating device including an acquiring section acquiring video images in which work of a worker is captured; a detecting section; a judging section; and a generating section.

10 Claims, 9 Drawing Sheets

(56) References Cited

U.S. PATENT DOCUMENTS

| | | | |
|---|---|---|---|
| 2017/0124387 A1* | 5/2017 | Iwamoto | G06V 10/56 |
| 2020/0167715 A1 | 5/2020 | Bhatt et al. | |
| 2020/0265363 A1* | 8/2020 | Yadhunandan | G06Q 10/06395 |
| 2020/0394589 A1* | 12/2020 | Trivelpiece | G06V 20/52 |
| 2020/0401981 A1 | 12/2020 | Nagayoshi et al. | |

FOREIGN PATENT DOCUMENTS

| | | |
|---|---|---|
| JP | 2020-091801 A | 6/2020 |
| JP | 2020-201772 A | 12/2020 |

OTHER PUBLICATIONS

Shan et al., "Understanding Human Hands in Contact at Internet Scale," University of Michigan, Johns Hopkins University, CVPR2020, pp. 9869-9878 (2020).
Cao et al., "OpenPose: Realtime Multi-Person 2D Pose Estimation using Part Affinity Fields," IEEE Transactions on Pattern Analysis and Machine Intelligence (2019).
Namioka et al., "Unsupervised Method to Automatically Measure Lead Time of Repetitive Processes Using Acceleration Data from Wearable Sensor on Worker," Toshiba Review, vol. 73, No. 3 (2018).
International Search Report and Written Opinion dated Apr. 11, 2023, for corresponding International Patent Application No. PCT/JP2023/003245.
Extended European Search Report issued in corresponding European Patent Application No. 23766364.6, dated Sep. 8, 2025.

\* cited by examiner

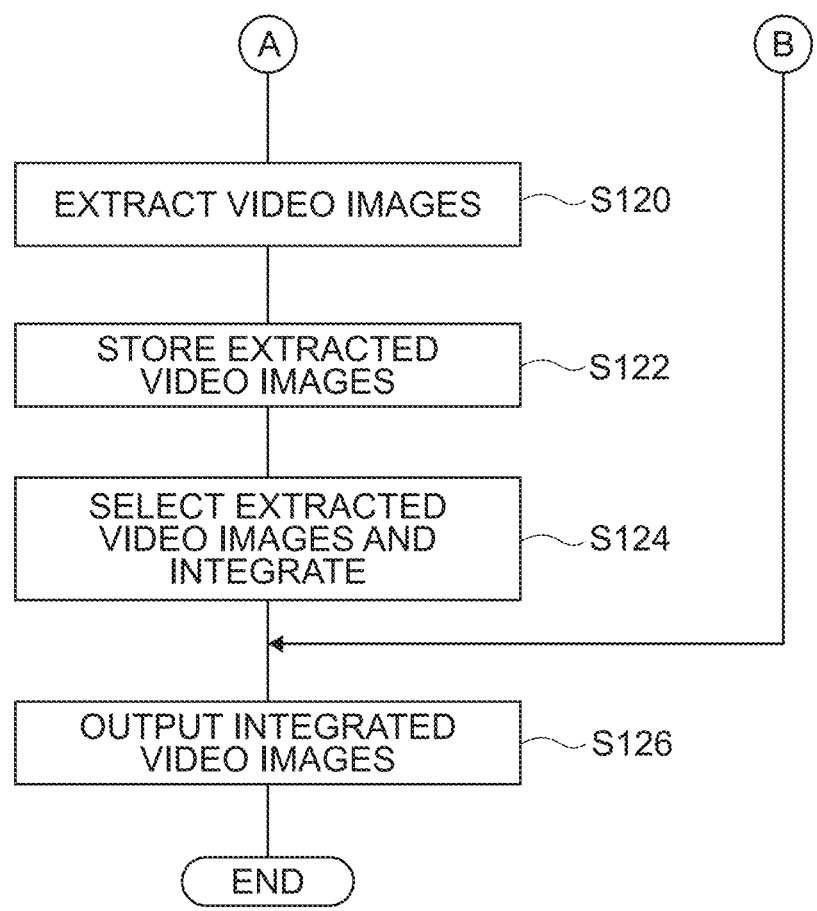

MOVING IMAGE INTEGRATION DEVICE, MOVING IMAGE INTEGRATION METHOD, AND MOVING IMAGE INTEGRATION PROGRAM

TECHNICAL FIELD

The technique of the present disclosure relates to a video image integrating device, a video image integrating method and a video image integrating program.

BACKGROUND ART

Japanese Patent Application Laid-Open (JP-A) No. 2020-91801 discloses a work analyzing system including: a time information acquiring section acquiring time information; a work video image acquiring section that captures images of the working state of a worker and obtains work video images; a work information acquiring section acquiring work information for inferring the work of the worker; a work estimating section that, on the basis of the work information, infers the work of the worker and determines a degree of reliability expressing the probability of the estimated work, and that, on the basis of the time information, determines a start time and an end time of the work for each estimated work; a work correlating section that demarcates the work video images by the start time and the end time of the estimated work, and correlates video images of a segment that is from the start time to the end time of the estimated work, the estimated work, and the degree of reliability for that work; a confirmation information outputting section outputting confirmation information for having a user discern whether or not the degree of reliability is less than a threshold value; an inputting section receiving input of instructions from a user; and a video image playback section that, on the basis of the input of instructions from the inputting section, plays-back video images of a segment in which the degree of reliability is less than the threshold value.

SUMMARY OF INVENTION

Technical Problem

When a work manager browses video images that capture work, the manager may try to check video images of plural types of scenarios.

However, in the technique disclosed in JP-A No. 2020-91801, because video images of segments in which the degree of reliability of the work is low are displayed, video images of desired plural types of scenarios cannot be browsed efficiently.

The technique of the disclosure was made in view of the above-described points, and an object thereof is to provide a video image integrating device, a video image integrating method and a video image integrating program that can generate video images for efficiently browsing plural types of scenarios.

Solution to Problem

A first aspect of the disclosure is a video image integrating device including: an acquiring section acquiring video images in which work of a worker is captured; a detecting section that, on the basis of the video images, detects time-series data of detection information relating to a skeleton or a region of the worker; a judging section that, on the basis of the detected time-series data of the detection information, and for each of plural types of scenarios to be extracted, judges whether the work is work satisfying a condition corresponding to the scenario to be extracted; and a generating section that, on the basis of a number of times of extraction or an extraction time period that were set for each of the plural types of scenarios to be extracted, generates video images that integrate video images of a portion that includes a point in time when it was judged that the work is work satisfying a condition corresponding to the scenario to be extracted.

A second aspect of the disclosure is a video image integrating method including: an acquiring section acquiring video images in which work of a worker is captured; on the basis of the video images, a detecting section detecting time-series data of detection information relating to a skeleton or a region of the worker; on the basis of the detected time-series data of the detection information, and for each of plural types of scenarios to be extracted, a judging section judging whether the work is work satisfying a condition corresponding to the scenario to be extracted; and, on the basis of a number of times of extraction or an extraction time period that were set for each of the plural types of scenarios to be extracted, a generating section generating video images that integrate video images of a portion that includes a point in time when it was judged that the work is work satisfying a condition corresponding to the scenario to be extracted.

A third aspect of the disclosure is a video image integrating program causing a computer to execute: acquiring video images in which work of a worker is captured; on the basis of the video images, detecting time-series data of detection information relating to a skeleton or a region of the worker; on the basis of the detected time-series data of the detection information, and for each of plural types of scenarios to be extracted, judging whether the work is work satisfying a condition corresponding to the scenario to be extracted; and, on the basis of a number of times of extraction or an extraction time period that were set for each of the plural types of scenarios to be extracted, generating video images that integrate video images of a portion that includes a point in time when it was judged that the work is work satisfying a condition corresponding to the scenario to be extracted.

Advantageous Effects of Invention

In accordance with the technique of the disclosure, video images for efficiently browsing plural types of scenarios can be generated.

BRIEF DESCRIPTION OF DRAWINGS

FIG. 9 is a flowchart of the video image integrating processing.

DESCRIPTION OF EMBODIMENTS

Figure 1:
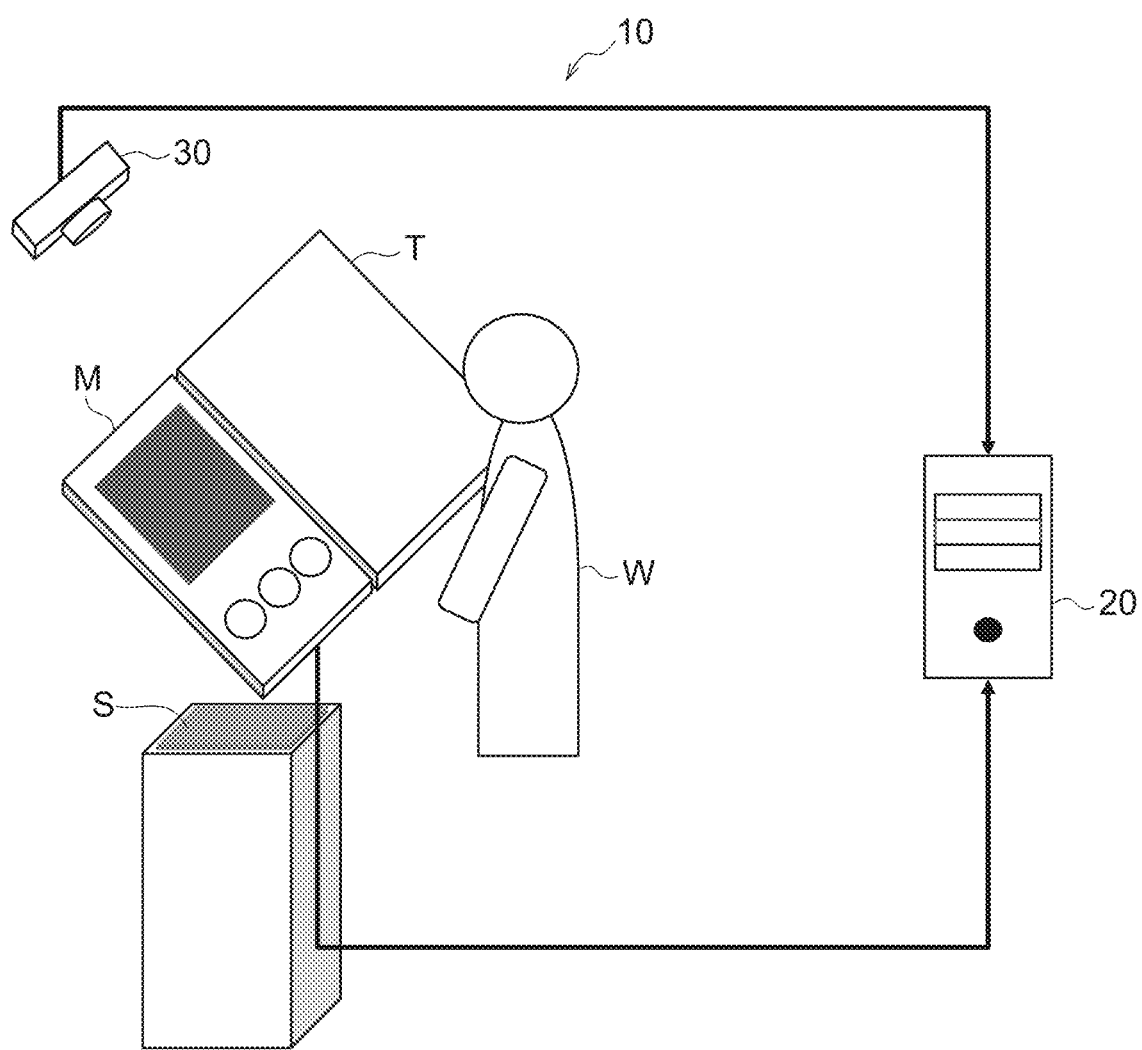
FIG. 1 is a structural drawing of a video image integrating system.

Examples of embodiments of the present disclosure are described hereinafter with reference to the drawings. Note that, in the respective drawings, the same reference numerals are applied to structural elements and portions that are the same or equivalent. Further, there are cases in which dimensions and ratios in the drawings are exaggerated for convenience of explanation, and there are cases in which they differ from actual ratios.

FIG. 1 illustrates the structure of a video image integrating system 10. The video image integrating system 10 has a video image integrating device 20 and a camera 30.

On the basis of video images captured by the camera 30, the video image integrating device 20 integrates video images that show work carried out by a worker W.

As an example, the worker W carries out a predetermined work by using device M on a work table T. The work table T is set in a place that is bright enough that the actions of persons can be recognized. In a case in which a defective product arises in the work, the worker W places the defective product in a defective product place S.

The camera 30 captures RGB color images for example, and outputs the images to the video image integrating device 20. Further, the camera 30 is set at a position at which the work carried out by the worker W is easily recognized. Specifically, the camera 30 is set at a position that satisfies conditions such as a position where the work of the worker W is not hidden by the work table T or the like, or a position at which the worker W, who has moved in front of the defective product place S, is not hidden by other objects or the like. In the present embodiment, as an example, description is given of a case in which the camera 30 is set at a position of looking down on at least the upper half of the body of the worker W from obliquely above.

Note that, although the present embodiment describes a case in which there is the one camera 30, there may be a structure in which plural cameras 30 are provided. Further, although the present embodiment describes a case in which there is the one worker W, there may be two or more workers W.

The device M that is used in the work outputs, to the video image integrating device 20, a log relating to usage of the device M including an error log. In a case in which an error occurs, the device M outputs the error log to the video image integrating device 20.

Figure 2:
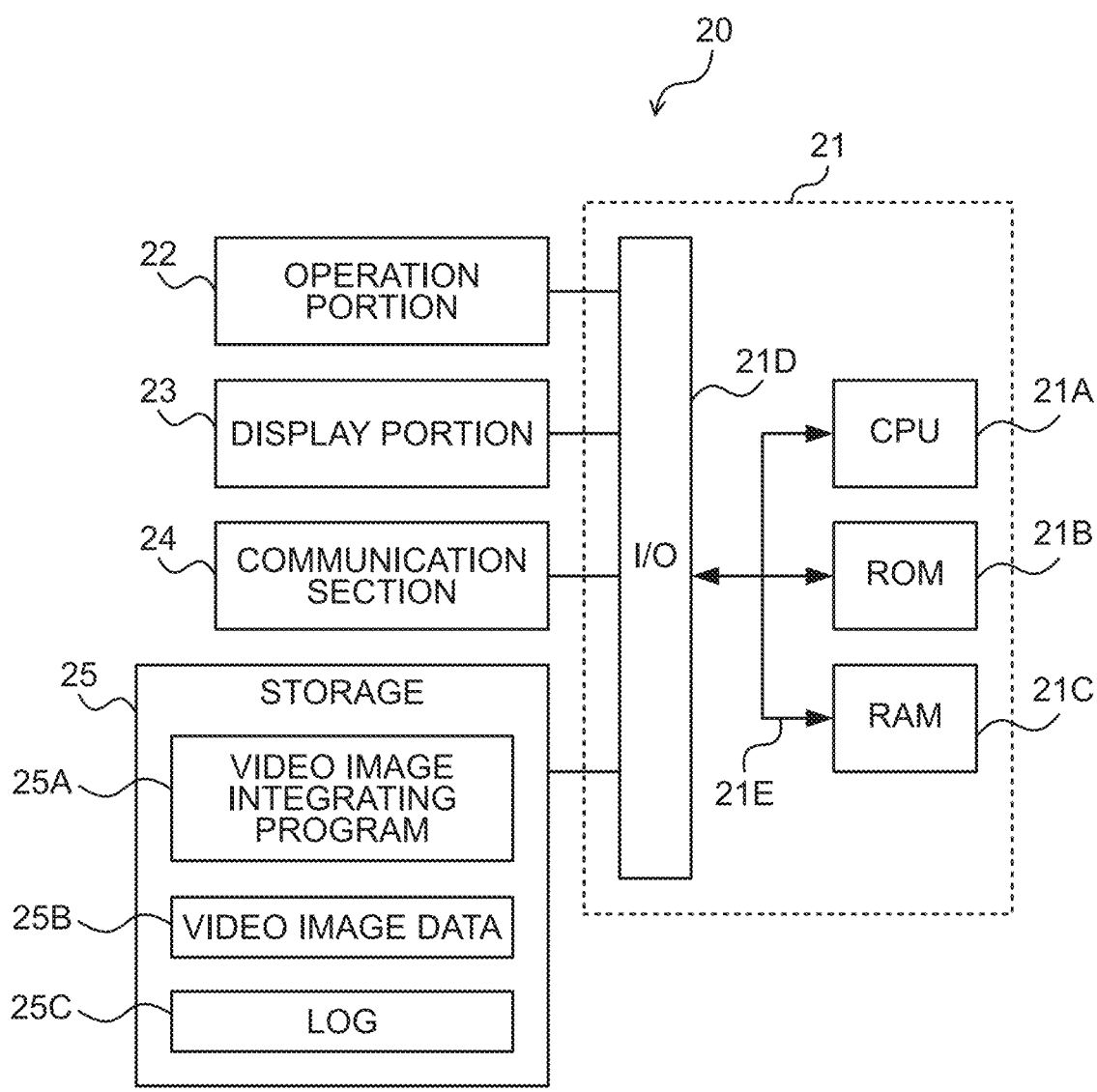
FIG. 2 is a structural drawing illustrating hardware structures of a video image integrating device.

FIG. 2 is a block drawing illustrating hardware structures of the video image integrating device 20 relating to the present embodiment. As illustrated in FIG. 2, the video image integrating device 20 has a controller 21. The controller 21 is structured by a device that includes a general computer.

As illustrated in FIG. 2, the controller 21 has a CPU (Central Processing Unit) 21A, a ROM (Read Only Memory) 21B, a RAM (Random Access Memory) 21C, and an input/output interface (I/O) 21D. The CPU 21A, the ROM 21B, the RAM 21C and the I/O 21D are connected to one another via busses 21E. The busses 21E include a control bus, an address bus and a data bus.

An operation portion 22, a display portion 23, a communication section 24 and a storage 25 are connected to the I/O 21D.

The operation portion 22 is structured to include a mouse and a keyboard for example.

The display portion 23 is structured by a liquid crystal display for example.

The communication section 24 is an interface for carrying out data communications with external devices such as the camera 30.

The storage 25 is structured by a non-volatile external storage device such as a hard disk. As illustrated in FIG. 2, the storage 25 stores a video image integrating program 25A, video image data 25B that is video images captured by the camera 30 and video images that have been extracted, a log 25C outputted from the device M, and the like.

The CPU 21A is an example of a computer. What is called a computer here means a processor in the broad sense, and includes generic processors (e.g., CPUs) and dedicated-use processors (e.g., GPUs: Graphics Processing Units, ASICs: Application Specific Integrated Circuits, FPGAs: Field-Programmable Gate Arrays, and programmable logic devices).

Note that the video image integrating program 25A may be realized by being stored on a non-volatile, non-transitory recording medium or distributed via a network, and being installed in the video image integrating device 20 appropriately.

A CD-ROM (Compact Disc Read Only Memory), a magneto-optical disk, an HDD (Hard Disk Drive), a DVD-ROM (Digital Versatile Disc Read Only Memory), a flash memory and a memory card are contemplated as examples of non-volatile, non-transitory recording media.

Figure 3:
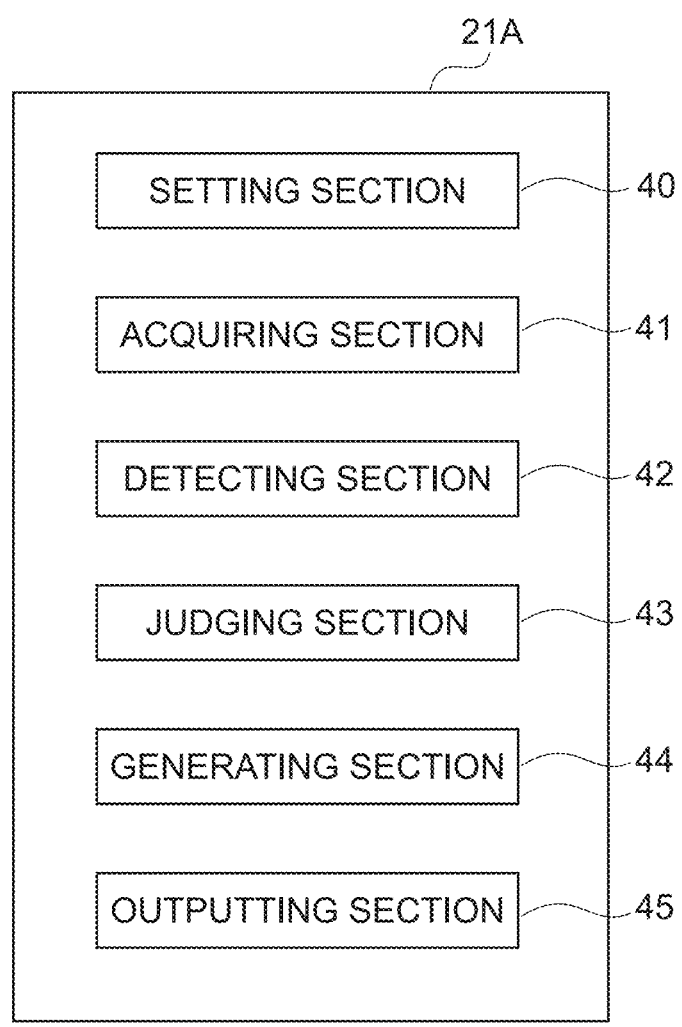
FIG. 3 is a functional block drawing of the video image integrating device.

FIG. 3 is a block drawing illustrating the functional structures of the CPU 21A of the video image integrating device 20. As illustrated in FIG. 3, the CPU 21A functionally has respective functional sections that are a setting section 40, an acquiring section 41, a detecting section 42, a judging section 43, a generating section 44 and an outputting section 45. The CPU 21A functions as the respective functional sections by reading-in and executing the video image integrating program 25A stored in the storage 25.

The setting section 40 receives a setting for the number of times of extraction or the extraction time period, for each of plural types of scenarios to be extracted.

For example, the plural types of scenarios to be extracted include scenarios in which the time period of the work cycle is greater than or equal to a threshold value that is the standard work time period, scenarios in which a defective product is placed at a defective product place, and scenarios in which an error log of the device M arises.

Further, in the setting screen that is displayed on the display portion 23, the setting of the number of times of extraction or the extraction time period and the setting of a standard work time period are received for each of the scenarios to be extracted and by operation of the operation portion 22. Here, the number of times of extraction means how many times that a scenario to be extracted is to be extracted. The extraction time period expresses how many minutes of the scenario to be extracted are to be extracted.

Further, in the setting screen that is displayed on the display portion 23, a setting relating to whether video images are to be newly acquired from the camera 30, and a setting relating to whether or not extraction is to be carried out from stored video images, are received by operation of the operation portion 22.

The acquiring section 41 acquires the video images, in which the camera 30 has captured the work of the worker W, from the camera 30 and stores the video images in the video image data 25B of the storage 25.

Further, the acquiring section acquires the log from the device M, and stores the log in the log 25C of the storage 25.

On the basis of the video images acquired from the camera 30, the detecting section 42 detects time-series data of detection information relating to a region of or the skeleton of the worker W.

Specifically, detection information relating to a region includes the coordinates of the four corners of a bounding box showing a range that includes a specific region (at least one hand among the left hand and the right hand). Here, the bounding box is a rectangular shape such as an oblong or a square that circumscribes an object that is the subject of detection. Specifically, the degree of reliability of the object that is the subject of detection is calculated for each of anchor boxes (oblong regions) that are plural sizes. Then, the coordinates of the four corners of the anchor box having the highest degree of reliability are used as the coordinates of the four corners of the bounding box. Known methods such as Faster R-CNN (Regions with Convolutional Neural Networks) for example can be used as such a method of detecting the bounding box, and, for example, the method disclosed in following Reference Document 1 can be used.
(Reference Document 1) "Faster R-CNN: Towards Real-Time Object Detection with Region Proposal Networks", Shaoqing Ren, Kaiming He, Ross Girshick and Jian Sun.

As a method that detects detection information relating to a region on the basis of video images, a trained model, whose input is images and that outputs detection information relating to a region, can be used as the trained model for detection that is trained by using a large number of images as teacher data. A known method such as CNN for example can be used as a training method that obtains such a trained model for detection, and the method disclosed in following Reference Document 2 can be used for example.
(Reference Document 2) "Understanding Human Hands in Contact at Internet Scale", pp. 9869-9878, Dandan Shan1, Jiaqi Geng, Michelle Shu, David F. Fouhey, University of Michigan, Johns Hopkins University, CVPR2020.

Further, detection information relating to the skeleton includes the coordinates of feature points of the region and the joints and the like of the body of the worker W, and link information that defines links connecting the respective feature points. For example, the feature points include regions of the face such as the eyes and nose, and joints such as the neck, shoulders, elbows, wrists, waist, knees and ankles of the worker W.

As a method that detects detection information relating to the skeleton on the basis of images, a trained model, whose input is images and that outputs detection information relating to the skeleton, can be used as the trained model for detection that is trained by using a large number of images as teacher data. A known method such as CNN (Regions with Convolutional Neural Networks) for example can be used as a training method that obtains such a trained model for detection, and the method disclosed in following Reference Document 3 can be used for example.
(Reference Document 3) "OpenPose: Realtime Multi-Person 2D Pose Estimation using Part Affinity Fields", Zhe Cao, Student Member, IEEE, Gines Hidalgo, Student Member, IEEE, Tomas Simon, Shih-En Wei, and Yaser Sheikh, IEEE TRANSACTIONS ON PATTERN ANALYSIS AND MACHINE INTELLIGENCE.

On the basis of the detected time-series data of the detection information and the time-series data of the acquired log, the judging section 43 judges, for each of the plural types of scenarios to be extracted, whether the work is work satisfying a condition corresponding to that scenario to be extracted.

Figure 4:
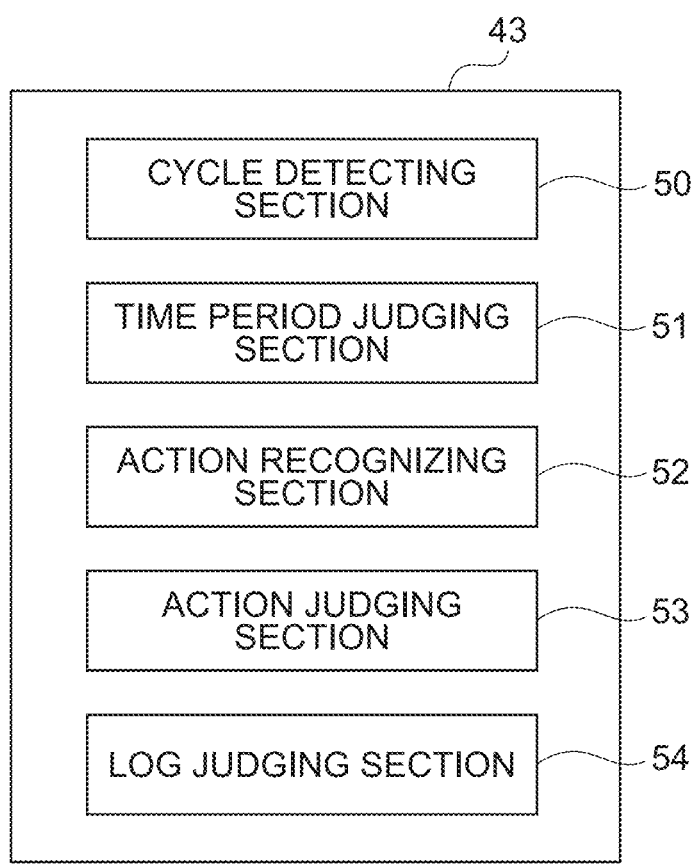
FIG. 4 is a functional block drawing of a judging section of the video image integrating device.

Specifically, as illustrated in FIG. 4, the judging section 43 is provided with a cycle detecting section 50, a time period judging section 51, an action recognizing section 52, an action judging section 53 and a log judging section 54.

On the basis of the detected time-series data of the detection information relating to the region and time-series data of the detection information relating to the skeleton, each work cycle, the cycle detecting section 50 analyzes the start time and the end time of the work cycle, and detects the time period of the work cycle.

Figure 5:
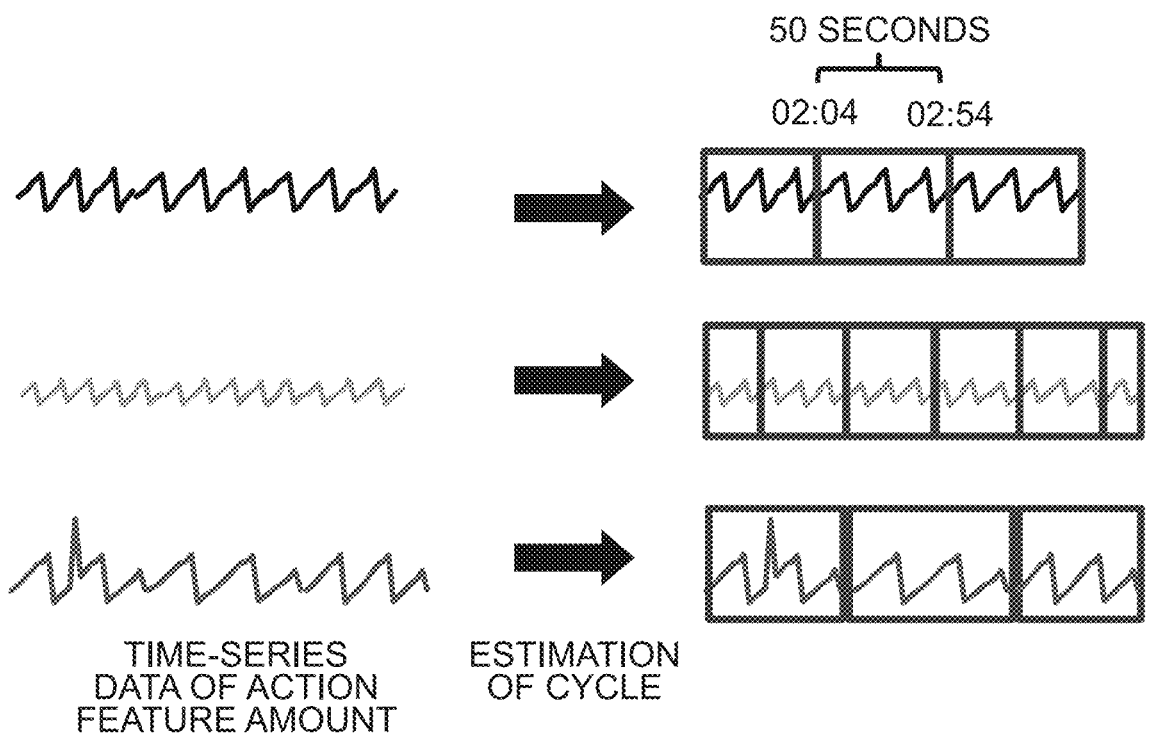
FIG. 5 is a drawing for explaining a method of detecting the time period of a work cycle.

Specifically, as illustrated in FIG. 5, by using DTW (Dynamic Time Warping), the cycle detecting section 50 automatically detects an action (signal) that appears periodically, from time-series data of action feature amounts extracted on the basis of the time-series data of the detection information relating to the region and the time-series data of the detection information relating to the skeleton. Due thereto, the cycle detecting section 50 detects the start time and the end time of the work cycle, and detects the time period of the work cycle. Above-described FIG. 5 illustrates an example in which the start time (2 minutes, 4 seconds) and the end time (2 minutes, 54 seconds) of the work cycle are detected, and the time period (50 seconds) of the work cycle is detected.

It suffices use a method similar to that of Reference Document 4 as the period estimating method using DTW, and therefore, detailed description thereof is omitted.
(Reference Document 4) Namioka Yasuo et al., "Unsupervised Method to Automatically Measure Lead Time of Repetitive Processes Using Acceleration Data from Wearable Sensor on Worker", searchable on the internet at <URL: https://www.global.toshiba/content/dam/toshiba/migration/corp/techReviewAssets/tech/review/2018/03/73_03pdf/a12.pdf>

Note that the above describes, as an example, a case of automatically detecting an action that appears periodically, by DTW and from time-series data of action feature amounts extracted on the basis of the time-series data of the detection information relating to the region and the time-series data of the detection information relating to the skeleton. However, the present invention is not limited to this. An action that appears periodically may be detected automatically by using DTW and from the time-series data of the detection information relating to the region or the time-series data of the detection information relating to the skeleton.

On the basis of the time period of the work cycle detected for each of the work cycles, in a case in which the time period of the work cycle is greater than or equal to a threshold value, the time period judging section 51 judges that the work is work satisfying a condition corresponding to a scenario in which the time period of the work cycle is greater than or equal to a threshold value. The time period judging section 51 records the start time and the end time of that work cycle.

On the basis of the detected time-series data of the detection information relating to the region or time-series data of the detection information relating to the skeleton, the action recognizing section 52 recognizes the action of the worker W placing a defective product at the defective product place S.

Specifically, the action of the worker W placing a defective product at the defective product place S is recognized on the basis of whether or not the worker W has moved to a position corresponding to the defective product place S.

Figure 6:
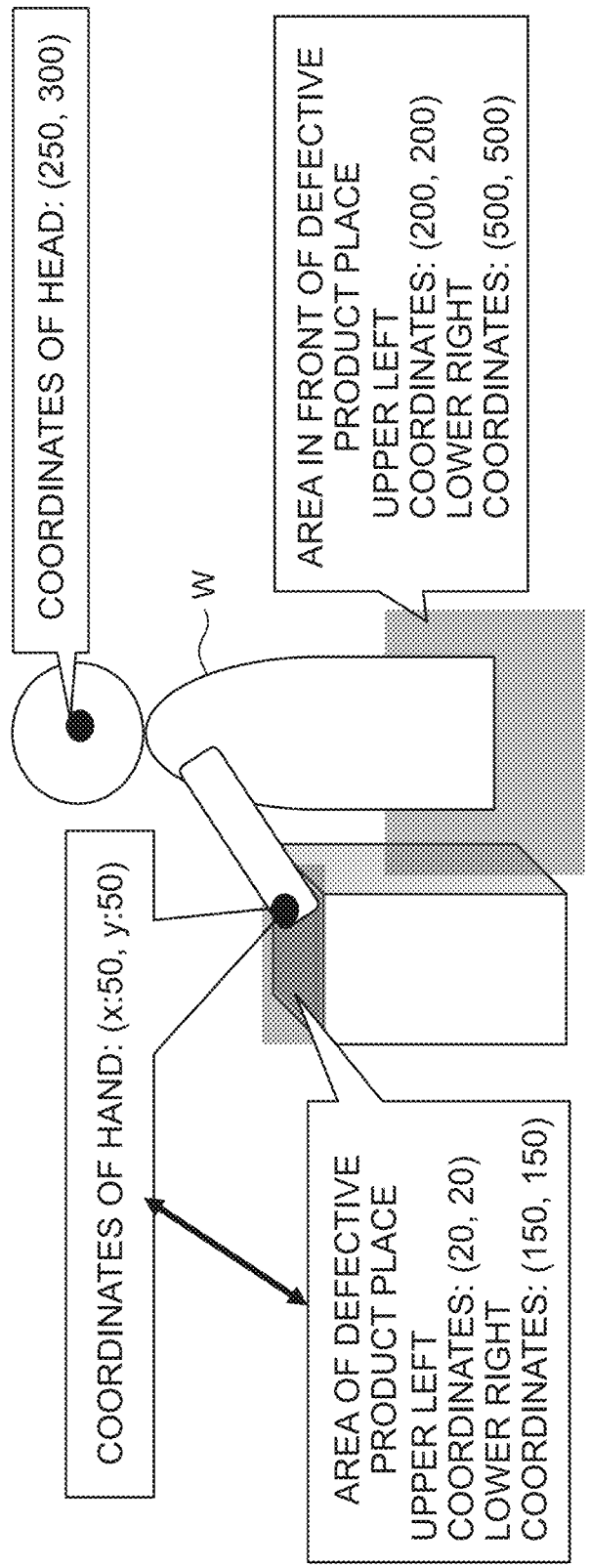
FIG. 6 is a drawing for explaining a method of recognizing an action of a worker placing a defective product at a defective product place.

For example, as illustrated in FIG. 6, in a case in which the coordinates (x,y)=(50,50) of either hand among the left hand and right hand exist within a rectangular range prescribed by the upper left coordinate (x,y)=(20,20) and the lower right coordinate (x,y)=(150,150) of the area of the defective product place S, it is recognized that there is a hand in the defective product place S and that the worker W is carrying out the action of placing a defective product at the defective product place S.

Or, in a case in which the coordinates (x,y)=(250,300) of the head exist within a rectangular region prescribed by the upper left coordinate (x,y)=(200,200) and the lower right coordinate (x,y)=(500,500) of an area in front of the defective product place S, it is recognized that the worker is in the area in front of the defective product place S and that the worker W is carrying out the action of placing a defective product at the defective product place S.

Note that the action of the worker W placing a defective product at the defective product place S may be recognized by using a trained prior model, on the basis of the detected time-series data of the detection information relating to the region or time-series data of the detection information relating to the skeleton.

In a case in which the action of the worker W placing a defective product at the defective product place S is recognized, the action judging section 53 judges that the work is work that satisfies a condition corresponding to a scenario in which the worker W carries out the action of placing a defective product at the defective product place S, and records that time.

On the basis of the time-series data of the log relating to the device M, the log judging section 54 judges whether or not the log is an error log. If the log is an error log, it is judged that the work is work satisfying a condition corresponding to a scenario in which an error log has arisen, and records that time.

On the basis of the number of times of extraction and the extraction time period that were set for each of the plural types of scenarios to be extracted, the generating section 44 extracts video images of a portion that includes the point in time when it was judged that the work is work satisfying a condition corresponding to the scenario to be extracted, and generates video images that integrate the extracted video images.

Figure 7:
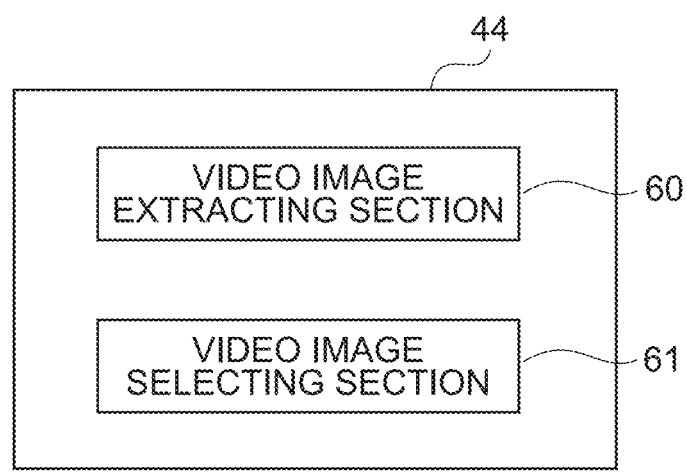
FIG. 7 is a functional block drawing of a generating section of the video image integrating device.

Specifically, as illustrated in FIG. 7, the generating section 44 has a video image extracting section 60 and a video image selecting section 61.

For each of the plural types of scenarios to be extracted, the video image extracting section 60 extracts the video images of the portion including the point in time when it was judged that the work is work satisfying a condition corresponding to the scenario to be extracted.

On the basis of the number of times of extraction or the extraction time period which were set for each of the plural types of scenarios to be extracted, the video image selecting section 61 selects the video images that were extracted for that scenario to be extracted, and generates video images that integrate the selected video images.

For example, for a scenario in which the time period of the work cycle is greater than or equal to a threshold value, in a case in which the number of times of extraction is set to four times, the following processings are carried out. Four cycles worth of video images, which have been extracted from the start time to the end time of a work cycle judged to be work satisfying a condition corresponding to a scenario in which the time period of the work cycle is greater than or equal to a threshold value, are selected. Then, video images, which integrate the selected four cycles worth of video images by joining them together, are generated.

The following processings are carried out in a case in which the extraction time period is set to be four minutes for a scenario in which the time period of the work cycle is greater than or equal to a threshold value. The video images, which are extracted from the start time to the end time of a work cycle judged to be work satisfying a condition corresponding to a scenario in which the time period of the work cycle is greater than or equal to a threshold value, are selected in a range not exceeding four minutes. Then, video images, which integrate the selected video images by joining them together, are generated.

The outputting section 45 outputs the video images in which the extracted video images are integrated, by displaying them on the display portion 23 or storing them in the storage 25.

Figure 8:
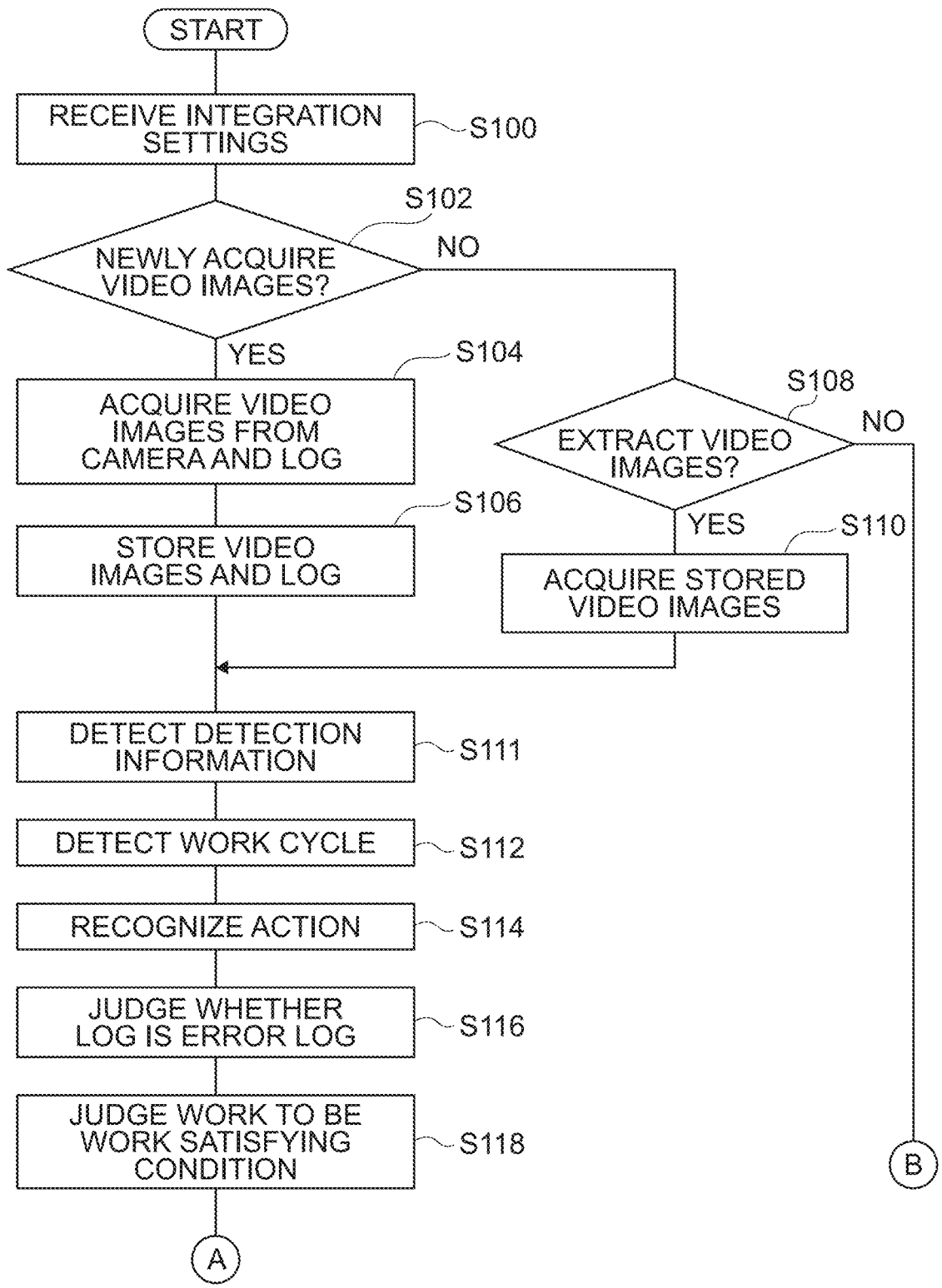
FIG. 8 is a flowchart of video image integrating processing.

The video image integrating processing executed at the CPU 21A of the video image integrating device 20 is described next with reference to the flowchart shown in FIG. 8.

In step S100, the CPU 21A receives, on the setting screen displayed on the display portion 23 and for each of the plural types of scenarios to be extracted, a setting for the standard work time period, and a setting for either the number of times of extraction that expresses how many times that scenario to be extracted is to be extracted or the extraction time period that expresses how many minutes of that scenario to be extracted are to be extracted. Further, the CPU 21A receives, in the setting screen displayed on the display portion 23, settings relating to whether to newly acquire video images from the camera 30 and whether or not to carry out extraction from stored video images. Note that the settings in step S100 do not have to be received each time that the video image integrating processing is carried out, and the settings in step S100 may be carried out periodically (e.g., once per month).

In step S102, the CPU 21A judges whether or not video images are to be newly acquired. If there is a setting that video images are to be to be newly acquired from the camera 30, the CPU 21A moves on to step S104. On the other hand, if there is a setting that video images are not to be newly acquired from the camera 30, the CPU 21A moves on to step S108.

In step S104, the CPU 21A acquires from the camera 30 video images capturing the work of the worker W, and acquires the time-series data of the log relating to the device M.

In step S106, the CPU 21A stores, in the storage 25, the acquired video images and time-series data of the log.

In step S108, the CPU 21A judges whether or not to carry out extraction from the stored video images. If there is a setting that extraction from stored video images is to be carried out, the CPU 21A moves on to step S110. On the other hand, if there is a setting that extraction from stored video images is not to be carried out, the CPU 21A moves on to step S126.

In step S110, the CPU 21A acquires, from the storage 25, video images that were captured in the past.

In step S111, on the basis of the video images acquired in above-described step S104 or step S110, the CPU 21A detects time-series data of the detection information relating to the region or the skeleton of the worker W.

In step S112, on the basis of the detected time-series data of the detection information relating to the region and time-series data of the detection information relating to the skeleton, each work cycle, the CPU 21A analyzes the start time and the end time of the work cycle and detects the time period of the work cycle.

In step S114, on the basis of the detected time-series data of the detection information relating to the region or time-series data of the detection information relating to the skeleton, the CPU 21A recognizes the action of the worker W placing a defective product at the defective product place S.

In step S116, the CPU 21A acquires time-series data of the log relating to the device M from the storage 25, and judges whether or not the log is an error log.

In step S118, for each of the plural types of scenarios to be extracted, the CPU 21A judges whether the work is work satisfying a condition corresponding to that scenario to be extracted. Specifically, on the basis of the time period of the work cycle detected for each work cycle, in a case in which the time period of the work cycle is greater than or equal to a threshold value, the CPU 21A judges that the work is work satisfying a condition corresponding to a scenario in which the time period of the work cycle is greater than or equal to a threshold value. The CPU 21A records the start time and the end time of that work cycle. In a case in which the CPU 21A recognizes the action of the worker W placing a defective product at the defective product place S, the CPU 21A judges that the work is work satisfying a condition corresponding to a scenario in which the worker W carries out the action of placing a defective product at the defective product place S, and records that time. In the case in which the log is an error log, the CPU 21A judges that the work is work satisfying a condition corresponding to a scenario in which an error log has arisen, and records that time.

In step S120, for each of the plural types of scenarios to be extracted, the CPU 21A extracts video images of a portion that includes the point in time at which it was judged that the work is work satisfying a condition corresponding to that scenario to be extracted.

In step S122, the CPU 21A stores, in the storage 25, the video images that were extracted for each of the plural types of scenarios to be extracted.

In step S124, on the basis of the number of times of extraction or the extraction time period that were set for each of the plural types of scenarios to be extracted, the CPU 21A selects the video images that were extracted for that scenario to be extracted, and generates video images in which the selected video images are integrated.

In step S126, the CPU 21A outputs the video images generated in above-described step S124 by displaying them on the display portion 23 or storing them in the storage 25.

In this way, in the present embodiment, video images, which integrate video images of a portion that includes the point in time when it was judged that the work is work satisfying a condition corresponding to the scenario to be extracted, are generated on the basis of the number of times of extraction or the extraction time period that have been set for each of the plural types of scenarios to be extracted. Due thereto, video images for efficiently browsing plural types of scenarios can be generated.

Note that the above-described embodiments merely explain structural examples of the present invention in an exemplifying manner. The present invention is not limited to the above-described specific forms, and various modifications are possible within the scope of the technical concepts thereof.

For example, an example has been described of a case in which the plural types of scenarios to be extracted are a scenario in which the time period of the work cycle is greater than or equal to a threshold value that is the standard work time period, a scenario in which a defective product is placed at a defective product place, and a scenario in which an error log of the device M arises. However, the present invention is not limited to this. The scenarios to be extracted may be other types of scenarios. The scenarios to be extracted may be scenarios relating to good work.

Further, an example has been described of a case in which the specific action of the scenario to be extracted is the action of placing a defective product at the defective product place, but the present invention is not limited to this. Actions other than the action of placing a defective product at the defective product place may be used as the specific action of the scenario to be extracted.

Further, the video image integrating processing, which is executed by the CPU reading-in software (a program) in the above-described embodiments, may be executed by any of various types of processors other than a CPU. Examples of processors in this case include PLDs (Programmable Logic Devices) whose circuit structure can be changed after production such as FPGAs (Field-Programmable Gate Arrays), and dedicated electrical circuits that are processors having circuit structures that are designed for the sole purpose of executing the recognition processing such as ASICs (Application Specific Integrated Circuits). Further, the video image integrating processing may be executed by one of these various types of processors, or may be executed by a combination of two or more of the same type or different types of processors (e.g., plural FPGAs, or a combination of a CPU and an FPGA). Further, the hardware structures of these various types of processors are, more specifically, electrical circuits that combine circuit elements such as semiconductor elements.

(Notes)

The following notes are further disclosed in relation to the above-described embodiments.

(Note 1)

A video image integrating device including:
a memory; and
at least one processor connected to the memory,
wherein the processor:
  acquires video images in which work of a worker is captured;
  on the basis of the video images, detects time-series data of detection information relating to a skeleton or a region of the worker;
  on the basis of the detected time-series data of the detection information, and for each of plural types of scenarios to be extracted, judges whether the work is work satisfying a condition corresponding to the scenario to be extracted; and
  on the basis of a number of times of extraction or an extraction time period that were set for each of the plural types of scenarios to be extracted, generates video images that integrate video images of a portion that includes a point in time when it was judged that the work is work satisfying a condition corresponding to the scenario to be extracted.

(Note 2)

A non-transitory storage medium storing a program executable by a computer to execute video image integrating processing,
wherein the video image integrating processing:
  acquires video images in which work of a worker is captured;

on the basis of the video images, detects time-series data of detection information relating to a skeleton or a region of the worker;

on the basis of the detected time-series data of the detection information, and for each of plural types of scenarios to be extracted, judges whether the work is work satisfying a condition corresponding to the scenario to be extracted; and on the basis of a number of times of extraction or an extraction time period that were set for each of the plural types of scenarios to be extracted, generates video images that integrate video images of a portion that includes a point in time when it was judged that the work is work satisfying a condition corresponding to the scenario to be extracted.

The disclosure of Japanese Patent Application No. 2022-038606 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A video image integrating device comprising:
a memory; and
at least one processor coupled to the memory,
the at least one processor being configured to:
acquire video images in which work of a worker is captured;
based on the video images, detect time-series data of detection information relating to a skeleton or a region of the worker;
based on the detected time-series data of the detection information, and for each of a plurality of types of scenarios to be extracted, judge whether the work is work satisfying a condition corresponding to the scenario to be extracted; and
based on a number of times of extraction or an extraction time period that were set for each of the plurality of types of scenarios to be extracted, generate video images that integrate video images of a portion that includes a point in time when it was judged that the work is work satisfying a condition corresponding to the scenario to be extracted.

2. The video image integrating device of claim 1, wherein:
the scenarios to be extracted include scenarios in which a time period of a work cycle is greater than or equal to a threshold value, and
for a scenario in which the time period of the work cycle is greater than or equal to the threshold value, based on the detected time-series data of the detection information, the at least one processor analyzes a time period of a work cycle each work cycle, and, if the time period of a work cycle is greater than or equal to the threshold value, judges that the work is work satisfying the condition.

3. The video image integrating device of claim 1, wherein:
the scenarios to be extracted include scenarios in which a worker carries out a specific action, and for a scenario in which the worker carries out a specific action, based on the detected time-series data of the detection information, the at least one processor judges that the work is work satisfying the condition in a case in which the worker has moved to a position corresponding to a place where the specific action is carried out.

4. The video image integrating device of claim 3, wherein the specific action is placing a defective product at a defective product place.

5. The video image integrating device of claim 1, wherein:
the scenarios to be extracted include scenarios in which an error log relating to a device used in the work arises, and
for a scenario in which an error log arises, in a case in which a log relating to the device used in the work is an error log, the at least one processor further judges that the work is work satisfying the condition.

6. A video image integrating method comprising:
an acquiring section acquiring video images in which work of a worker is captured;
based on the video images, a detecting section detecting time-series data of detection information relating to a skeleton or a region of the worker;
based on the detected time-series data of the detection information, and for each of a plurality of types of scenarios to be extracted, a judging section judging whether the work is work satisfying a condition corresponding to the scenario to be extracted; and
based on a number of times of extraction or an extraction time period that were set for each of the plurality of types of scenarios to be extracted, a generating section generating video images that integrate video images of a portion that includes a point in time when it was judged that the work is work satisfying a condition corresponding to the scenario to be extracted.

7. A non-transitory storage medium storing a program executable by a computer so as to execute video image integrating processing, the video image integrating processing including:
acquiring video images in which work of a worker is captured;
based on the video images, detecting time-series data of detection information relating to a skeleton or a region of the worker;
based on the detected time-series data of the detection information, and for each of a plurality of types of scenarios to be extracted, judging whether the work is work satisfying a condition corresponding to the scenario to be extracted; and
based on a number of times of extraction or an extraction time period that were set for each of the plurality of types of scenarios to be extracted, generating video images that integrate video images of a portion that includes a point in time when it was judged that the work is work satisfying a condition corresponding to the scenario to be extracted.

8. The video image integrating device of claim 2, wherein:
the scenarios to be extracted include scenarios in which a worker carries out a specific action, and for a scenario in which the worker carries out a specific action, based on the detected time-series data of the detection information, the at least one processor judges that the work is work satisfying the condition in a case in which the worker has moved to a position corresponding to a place where the specific action is carried out.

9. The video image integrating device of claim 8, wherein the specific action is placing a defective product at a defective product place.

10. The video image integrating device of claim 2, wherein:
the scenarios to be extracted include scenarios in which an error log relating to a device used in the work arises, and for a scenario in which an error log arises, in a case in which a log relating to the device used in the work is an error log, the at least one processor further judges that the work is work satisfying the condition.

* * * * *